United States Patent [19]

Chao et al.

[11] Patent Number: 4,492,039
[45] Date of Patent: Jan. 8, 1985

[54] METHOD AND APPARATUS FOR DRYING AND HANDLING SLUDGE

[76] Inventors: Allen C. Chao, 1301 DeBoy St., Raleigh, N.C. 27606; Barney K. Huang, 3332 Minor Ridge Dr., Raleigh, N.C. 27603; James S. J. Wang, 1309 Seabrook Ave., Cary, N.C. 27511

[21] Appl. No.: 493,213

[22] Filed: May 10, 1983

[51] Int. Cl.³ .......................... F26B 3/28; F26B 11/02
[52] U.S. Cl. ............................................. 34/4; 34/17; 34/39; 34/68; 34/93; 34/130; 110/226; 159/1 S; 202/136; 203/DIG. 1
[58] Field of Search ............... 34/68, 93, 130, 4, 17, 34/33, 39; 110/226; 202/136; 203/DIG. 1; 159/1 S

[56] References Cited
U.S. PATENT DOCUMENTS

| | | | |
|---|---|---|---|
| 3,618,540 | 11/1971 | Wenger et al. | 110/226 |
| 4,082,532 | 4/1978 | Imhof | 34/12 |
| 4,109,395 | 8/1978 | Huang | 34/93 |
| 4,240,210 | 12/1980 | Huang | 34/39 |

Primary Examiner—Larry I. Schwartz
Assistant Examiner—David W. Westphal
Attorney, Agent, or Firm—Mills & Coats

[57] ABSTRACT

The present invention relates to a method and apparatus for drying and handling sludge. Sludge is conveyed or transferred into a rotary drying chamber that may be housed within a structure such as a solar drying structure. The rotary drying chamber is provided with a perforated side wall structure. As the rotary drying chamber is rotated, the action of the sludge within the drying chamber results in the sludge being transferred from the drying chamber through the side wall structure thereof. In particular, as the sludge is dried, the movement of the sludge within the drying chamber and particularly the impact of the sludge against the internal side wall structure of the drying chamber causes the sludge to be forced outwardly through the perforated side wall structure of the drying chamber in a spaghetti-like fashion. That is, the dried sludge is emitted through the side wall portion of the drying chamber in the form of relatively small spaghetti-like portions. During the process these small spaghetti-like portions break and fall onto a conveyor that conveys the same to a selected point in the drying system.

12 Claims, 3 Drawing Figures

METHOD AND APPARATUS FOR DRYING AND HANDLING SLUDGE

FIELD OF INVENTION

The present invention relates to drying sludge and more particularly to a method and process of drying sludge in a rotary drying chamber wherein the sludge is emitted from the side wall structure thereof in small spaghetti-like portions.

BACKGROUND OF INVENTION

It has been known in the past to utilize solar energy in the treatment of water and waste material and particularly a sludge resulting therefrom. For example, one is referred to the earlier work of Dr. B. K. Huang et al. In U.S. Pat. No. 4,240,210, Dr. Huang et al discloses a method and apparatus for utilizing solar energy in a water and waste management system. In the Huang et al system, it is provided at least one rotary chamber disposed within a drying structure having a transparent outer wall of substantial area. Water and/or waste material is directed into the rotary chamber and free water contained within the sludge material received within the chamber is drained therefrom. Solar radiation passes through the transparent outer wall of the drying structure and is collected about the wall structure of the rotary chamber. Solar energy in the form of heat is utilized to dry the sludge contained within the rotary drying chamber by directing air about and through the same. After the sludge is dried a predetermined or selected moisture content, the dried sludge is conveyed to an end portion of the rotary chamber where the sludge is deposited or collected. In the Huang et al disclosure, there is suggested an auger-type conveyor that is disposed within the rotary drying chamber itself and this auger-type conveyor is actually used to convey the dried sludge from the rotary drying chamber.

SUMMARY AND OBJECTS OF PRESENT INVENTION

The present invention, as contrasted to the Huang et al disclosure, relates to the same basic type of sludge drying system. But the present invention deals with a new and novel approach to extracting the dried sludge from the rotary drying chamber. In particular, instead of using auger-type conveyor to convey the sludge material from the rotary drying chamber, the present invention contemplates the continuous extraction or the continuous conveying of the sludge material from the outer wall structure of the rotary drying chamber during the actual drying process itself.

To accomplish this, the rotary drying chamber of the present invention is provided with a perforated outer wall structure wherein there is provided a plurality of openings therein of a predetermined and selected size. The openings provided in the outer side wall structure of the rotary drying chamber are utilized to form a spaghetti-like sludge portions as the sludge is dried and the rotary drying chamber is rotated. More particularly, as the chamber rotates and as the sludge is dried, it follows that the sludge will move about internally within the chamber and will in fact impact against various areas of the internal perforated wall structure. The impact of the sludge and the general rotary movement of the drying chamber will result in the sludge being forced through the plurality of openings so as to emit or form spaghetti-like sludge portions through the openings of the perforated outer side wall structure of the drying chamber.

These formed spaghetti-like sludge portions will actually extend through and form the outer wall structure as the chamber is rotated. As their length extends, portions of these spaghetti-like portions will break off and drop onto a conveyor system where the spaghetti-like sludge particles are conveyed to a selected site or location.

It is, therefore, an object of the present invention to provide an efficient method and system for drying sludge.

More particularly, it is an object of the present invention to provide an effective and efficient sludge drying system that has the capability of continuously conveying dried sludge from a rotary drying chamber.

Still a further object of the present invention resides in the provision of a sludge drying and handling system that provides for the efficient and effective transfer of dried sludge from a rotary drying chamber with a minimum of actual conveying structure.

Also, it is an object of the present invention to provide a method and system for drying and handling sludge of the character referred to above wherein actual conveying of dried sludge from the drying chamber of the system is accomplished in large part by the inherent structure and function of the drying chamber per se.

A further object of the present invention resides in the provision of the method of drying and handling sludge wherein the method entails forming the dried sludge into relatively small spaghetti-like portions during the drying process.

Other objects and advantages of the present invention will become apparent from a study of the following description and the accompanying drawings which are merely illustrative of the present invention.

METHOD AND APPARATUS FOR DRYING AND HANDLING SLUDGE

With further reference to the drawings, the sludge drying and handling system of the present invention is shown therein. Again, reference is made to U.S. Pat. No. 4,240,210 to Dr. B. K. Huang et al. This patent discloses a basic solar waste drying system and the same is expressly incorporated herein by reference. For a detailed and unified understanding of a solar water and/or waste material drying system, one is referred to this disclosure.

Figure 1:
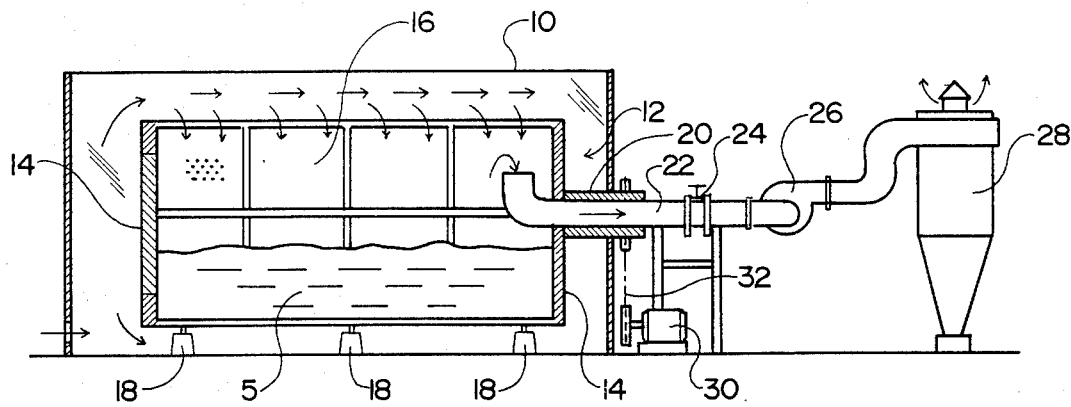
FIG. 1 is a side elevational view of a section of a sludge drying system showing a basic sludge drying operation.

In a brief manner, however, a typical solar waste drying system is diagrammatically illustrated in FIG. 1. Viewing FIG. 1, it is seen that there is shown a solar drying structure 10 therein. Drying structure 10 would include a structure having a transparent wall structure of a substantial area, such as a greenhouse type structure for example. Disposed internally within drying structure 10 is a rotary sludge drying chamber indicated generally by the numeral 12. Rotary drying chamber 12 is rotatively mounted within drying structure 10 and for purposes of illustration in FIG. 1, it is disposed and supported by a plurality of rollers 18. Drying chamber 12 includes a pair of end walls 14 and a cylindrical side wall structure 16. It will be appreciated that a particular end wall 14 of the rotary drying chamber 12 would be provided with an access opening for allowing sludge, water and other waste type material to be conveyed therein.

Continuing to refer to FIG. 1 for background purposes, it is seen that the rotary drying chamber 12 is illustrated to have a hollow shaft 20 that is rotatively journaled within an end wall of the drying structure 10. Extending through shaft 20 and communicatively connected to the inside of drying chamber 12 is a conduit 22. Conduit 22 includes a valve 24 and further is communicatively connected to a fan 26, and a sludge feeding pipe through a second valve. Fan 26 is in turn operatively connected to a conventional cyclone cleaner 28.

Electric motor 30 is drivingly interconnected to the rotary drying chamber 12 via shaft 20 so as to have the capability to rotatively drive the rotary sludge drying chamber 12. As indicated in the drawings, a flexible connector such as a belt or chain 32 is drivingly interconnected between motor 30 and shaft 20.

As illustrated in FIG. 1, to dry sludge material S contained within rotary drying chamber 12, fan 26 effectively circulates a system of air into and through rotary sludge drying chamber 12. In particular, as indicated in FIG. 1, outside air is drawn into drying chamber 10 and this air is directed around rotary drying chamber 12 and induced inwardly therein through perforated openings 34 formed in the side wall structure 16 of the drying chamber 12. It is appreciated that the outside of chamber 12 could be painted thermally black so as to collect solar energy being transmitted through the transparent drying structure 10. As air is passed around chamber 12, heat collected from the solar energy is transferred thereto and the solar heated air is directed into and through the drying chamber as such effectively dries the sludge material S contained therein. The air passing within chamber 12 is then induced into conduit 22 where the same is directed through fan 26 and into and through cyclone cleaner 28.

Figure 2:
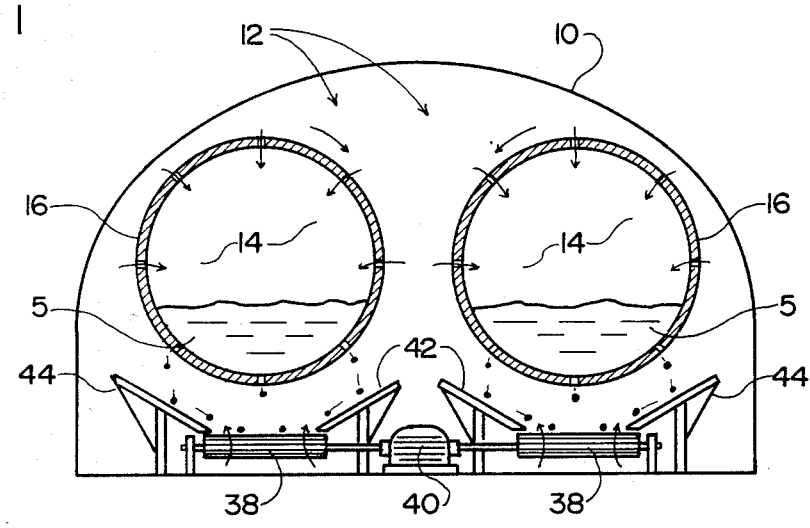
FIG. 2 is a transverse sectional view in diagrammatic form of the sludge drying and handling system of the present invention.
Figure 3:
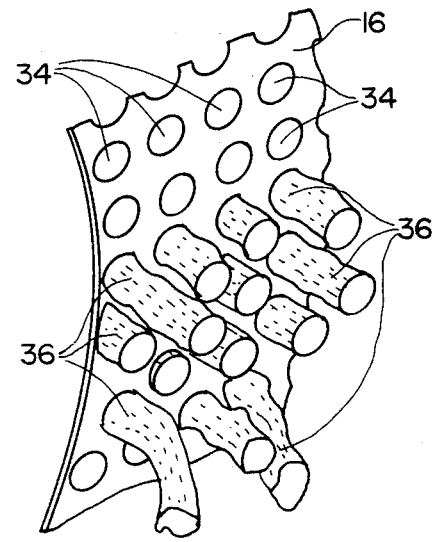
FIG. 3 is a fragmentary perspective view of the perforated side wall structure of the sludge and drying chamber of the present invention and which particularly illustrates the forcing of sludge material through the perforated outer wall structure in spaghetti-like form.

The present invention, as particularly illustrated in FIGS. 2 and 3, is directed at a new and novel system and method for conveying the dried sludge S from the respective drying chambers 12. In this regard, the present invention discloses a method wherein the sludge S is forced outwardly through the side wall structure 16, actually through perforated openings 34 formed in the side wall structure 16. It is the intent of this invention to convey or transfer the dried sludge from the drying chamber through the inherent and natural rotary movement of the drying chamber per se. Accomplishing this, openings 34 are particularly sized and spaced in a contemplated design, the openings 34 are generally circular and are approximately nine millimeters in diameter. In addition, in a comtemplated design, the respective openings are spaced approximately four millimeters apart, that is that particular spacing is the spacing between the closest points of the respective openings 34.

Therefore, as the respective cylinders 12, as viewed in FIGS. 2 and 3, are rotated, the sludge material S therein is moved within cylinders 12. The movement of the sludge as the cylinders are rotated causes the sludge to be flopped around, almost like dough, and the sludge materials falls adjacent the internal side wall structure 16 of the cylinders. As the sludge material falls against the wall structure of the cylinders 12, there is impact of the sludge against the cylinders 16. This impact dries the sludge material to and through the particular openings 34. As the sludge material S is impacted against the side wall structure 16 and caused to move through the respective openings 34, it is seen in FIG. 3 that the sludge exits the exterior of the side wall structure 16 in a spaghetti-like fashion. That is, the sludge is shaped and transformed into elongated spaghetti-like strands or portions that are referred to in FIG. 3 by the numeral 36. It should be appreciated that air is still allowed to move through openings 34. Often air is even allowed to move between respective openings 34 and the spaghetti-like sludge material 36. This obviously contributes to the direct drying of the sludge in the spaghetti-like form as well as ultimately contributing to drying the sludge material S contained within the chambers 12.

As the chambers 16 are continued to be rotated, the spaghetti-like sludge material 36 accumulates about a substantial area of the rotary drying chambers 12. As the spaghetti-like sludge material 36 becomes elongated and extends out the outer side of wall 16, portions thereof tend to break off and fall from the respective drying chambers 12.

To receive the respective spaghetti-like sludge portions that fall from the chambers 12, there is provided a pair of screen conveyors 38 disposed below the respective chambers 12 and driven by a power source such as a motor 40. There is also provided below each chamber 12 a pair of deflector shields 42 and 44 that extend generally the length of each cylinder 12 and which is designed so as to extend inwardly at an angle, as shown in FIG. 2, to aid in directing the dried spaghetti-like sludge material onto the respective conveyors 38.

FIG. 2 is essentially a diagrammatic illustration inasmuch as the essence of the present invention lies in the method of forming the spaghetti-like sludge strands and transferring the same from the cylinders 12. It should be appreciated that although the present invention is disclosed in conjunction with a solar drying structure, that the present invention can be utilized in a wide variety of ways and is not necessarily restricted to an application of solar drying. In addition, it is appreciated that the cylinders 12, as shown in FIG. 2, can be supported for rotation about opposite ends, or alternatively, some form of roller structure can be extended upwardly from the deflector shields 42 and 44 to so support the respective cylinders for rotation.

It should be pointed out that spaghetti-like sludge portions separate and break off by their own weight. In test conducted, it was found that sludge could be dried to a water content of twenty to thirty-three percent. It is contemplated that the respective drying chambers can be driven or rotated at about one RPM. In some experimental work, the drying chamber was rotated intermittingly. The slower rotating speed will allow more time for the sludge to be dried, and consequently one would expect the sludge under such circumstances to be of a less moisture content.

From the foregoing specification and discussion, it is appreciated that the present invention presents a new and novel way of effectively conveying dried sludge from a rotary sludge drying chamber. Of particular importance is the fact that the present invention utilizes the inherent rotary movement of the sludge drying chamber to achieve this and as a consequence, avoids the requirement of providing a specially designed conveyor to extract dried sludge from the drying chamber.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. An apparatus for drying and handling sludge comprising:
   A. a rotary drying chamber having a pair of ends and a side wall and adapted to receive sludge;
   B. said side wall including a plurality of generally uniformly spaced perforations formed from one end of said drying chamber to the other end with said perforations being formed over substantially the entire area of said side wall;
   C. means for drying the sludge within said rotary drying chamber, said drying means including means for generating a system of drying air and directing the system of drying air from outwardly of said rotary drying chamber through said perforations in the side wall of said rotary drying chamber, and into said rotary drying chamber for drying the sludge therein;
   D. means for forming the sludge material within said rotary drying chamber into relatively short spaghetti-like sludge portions and expelling the sludge in the form of said spaghetti-like sludge portion from said rotary drying chamber, said means for forming the sludge into said relatively small sludge-like portions and expelling the same from said rotary drying chamber including means for rotating said rotary drying chamber and moving the sludge therein from one portion of the drying chamber to another as said rotary drying chamber is rotated and causing the sludge within the drying chamber to be impacted against the side wall of the drying chamber so as to force the sludge outwardly from said drying chamber through said perforations formed in the side wall of said drying chamber which in turn forms the spaghetti-like sludge portions which project outwardly from the side wall of said drying chamber as the same is rotated; and
   E. means for directing the system of generated drying air into actual drying contact with said spaghetti-like sludge portions projecting outwardly from said side wall of said drying chamber while said spaghetti-like sludge portions actually project from said drying chamber so as to actually dry the formed spaghetti-like sludge portion while they project from said drying chamber as the same is rotated.

2. The apparatus of claim 1 including conveyor means disposed below said drying chamber for receiving said spaghetti-like sludge portions being emitted from said drying chamber and conveying the same to a selected point.

3. The apparatus of claim 2 wherein said conveyor means includes a screen-like conveyor that allows air to pass therethrough, and wherein said screen-like conveyor further provides an opportunity for the drying of said spaghetti-like sludge portions received thereon.

4. The apparatus of claim 2 wherein there is provided a pair of laterally spaced inclined deflector shields disposed generally between said drying chamber and said conveying means, and wherein said deflector shields extends generally the length of said drying chamber and are inclined inwardly and downwardly from an upper elevated outer point so as to form a hopper-like effect over said conveying means such that the spaghetti-like sludge portions that fall from said drying chamber may in turn fall on said deflector shield after which the spaghetti-like sludge portions move under the influence or gravity downwardly and inwardly to said conveyor means.

5. The sludge drying apparatus of claim 4 wherein a second sludge drying chamber is provided so as to form a system of two sludge drying chambers, and wherein said two sludge drying chambers are disposed in side-by-side relationship; and wherein a second conveyor means is provided and disposed below said second drying chamber and wherein a second set of deflector shields of the type already recited are operatively interposed between said second sludge drying chamber and said second conveying means; and wherein said two sludge drying chambers are housed within a single structure.

6. The sludge drying apparatus of claim 1 wherein said openings in said side wall structure that form said spaghetti-like sludge portions are generally circular openings having a diameter of approximately nine millimeters.

7. The sludge drying apparatus of claim 6 wherein said openings are formed in said side wall structure of said drying chamber in side-by-side relationship; and wherein selected openings are generally spaced approximately four millimeters apart.

8. A method of drying and handling sludge comprising the steps of:
   A. transferring sludge into a rotary drying chamber having an outer wall with perforations formed therein;
   B. directing a system of drying air from outwardly of said drying chamber, through said perforations, and into said drying chamber;
   C. moving said system of drying air interally through said drying chamber to dry the sludge therein;
   D. rotating said drying chamber as said system of drying air is directed inwardly through said perforations into said drying chamber;
   E. moving the sludge contained within said drying chamber around as said drying chamber is rotated such that the sludge tends to assume a dough-like consistency as the same is moved from one portion of the drying chamber to another portion as the drying chamber is rotated;
   F. continuously impacting the dough-like sludge within said drying chamber against the wall of said drying chamber as the same is rotated;
   G. forcing said sludge within said drying chamber outwardly through said perforations within said wall of said drying chamber in response to said continuous impacting of the dough-like sludge against the wall of said drying chamber as said drying chamber is rotated;
   H. forming said sludge being forced outwardly of said drying chamber into relatively small spaghetti-like portions that project outwardly from said wall and which increase in length as said drying chamber is rotated and the dough-like sludge is moved around therein and impacted against the wall of the drying chamber as the same is rotated;

I. passing said system of drying air into actual contact with said spaghetti-like sludge portions while they project outwardly from the wall of said drying chamber and actually drying the spaghetti-like sludge portions while they project outwardly from the drying chamber; and J. increasing the length of said spaghetti-like sludge portion by continuing to rotate said drying chamber and breaking said extending spaghetti-like portion from the wall of said drying chamber due to gravity force in conjunction with the rotation of said drying chamber.

9. The method of drying and handling sludge of claim 8 further including the step of receiving the spaghetti-like sludge portions emitted from said drying chamber and conveying the same to a selected point.

10. The method of drying and handling sludge of claim 9 further including the step of collecting available solar energy and transferring said collected solar energy to said sludge within said drying chamber so as to utilize said collected solar energy for the purpose of drying said sludge.

11. The method of drying and handling sludge, as recited in claim 8, further including the steps of:
   A. enclosing said rotary drying chamber within a solar drying structure having a transparent wall of substantial area for allowing solar radiation to pass therethrough;
   B. rotating said rotary drying chamber and collecting solar energy about the wall structure thereof; and
   C. transferring the collected solar energy inwardly to the sludge contained within said rotary drying chamber.

12. The method of utilizing solar energy to dry waste material of claim 11 further including the step of receiving said spaghetti-like sludge material portions emitted by said rotary drying chamber on a conveyor, and conveying said spaghetti-like sludge material portions to a selected point.

* * * * *